United States Patent [19]
Crepel et al.

[11] Patent Number: 5,495,650
[45] Date of Patent: Mar. 5, 1996

[54] TUBULAR SUPPORT FOR INSTALLING A CONTRACTABLE ELASTIC SLEEVE

[75] Inventors: Denis Crepel, Erembodegem; Jozef Cardinaels, Lochristi, both of Belgium

[73] Assignee: Euromold, Brussels, Belgium

[21] Appl. No.: 265,156

[22] Filed: Jun. 24, 1994

[30] Foreign Application Priority Data

Jun. 25, 1993 [FR] France ................... 93 07774

[51] Int. Cl.$^6$ .................................. B23P 19/02
[52] U.S. Cl. ................................... 29/235
[58] Field of Search ............... 29/234, 235, 450, 29/282; 174/84 R, 135, 127

[56] References Cited

U.S. PATENT DOCUMENTS 4,506,430  3/1985  Guzay, Jr. .

FOREIGN PATENT DOCUMENTS 2592825  6/1987  France .
961447   4/1957  Germany .

*Primary Examiner*—Robert C. Watson
*Attorney, Agent, or Firm*—Sughrue, Mion, Zinn, Macpeak & Seas

[57] ABSTRACT

The tubular support for installing a contractable elastic sleeve comprises a rigid tube covered on its outside by a film having a low coefficient of friction. It also includes guide and drive means for the film which is mounted so as to be completely free relative to the tube, which means guide and drive the film around a front end and against the inside surface of the tube. The support is applicable to installing a elastic sleeve on a cylindrical element.

13 Claims, 3 Drawing Sheets

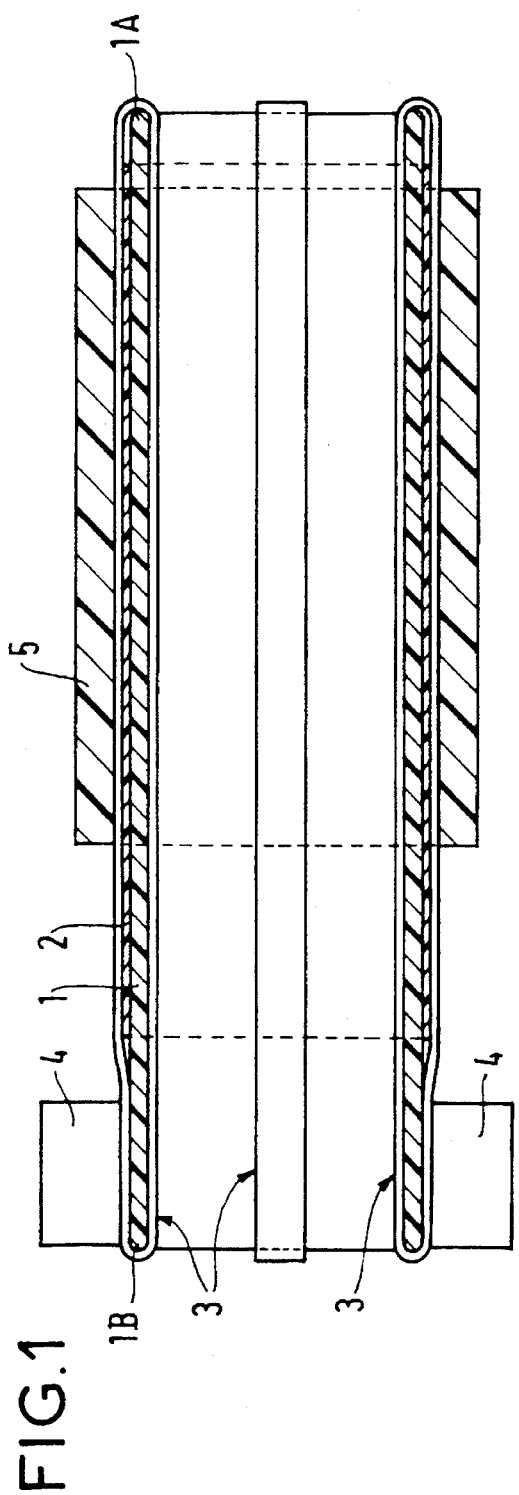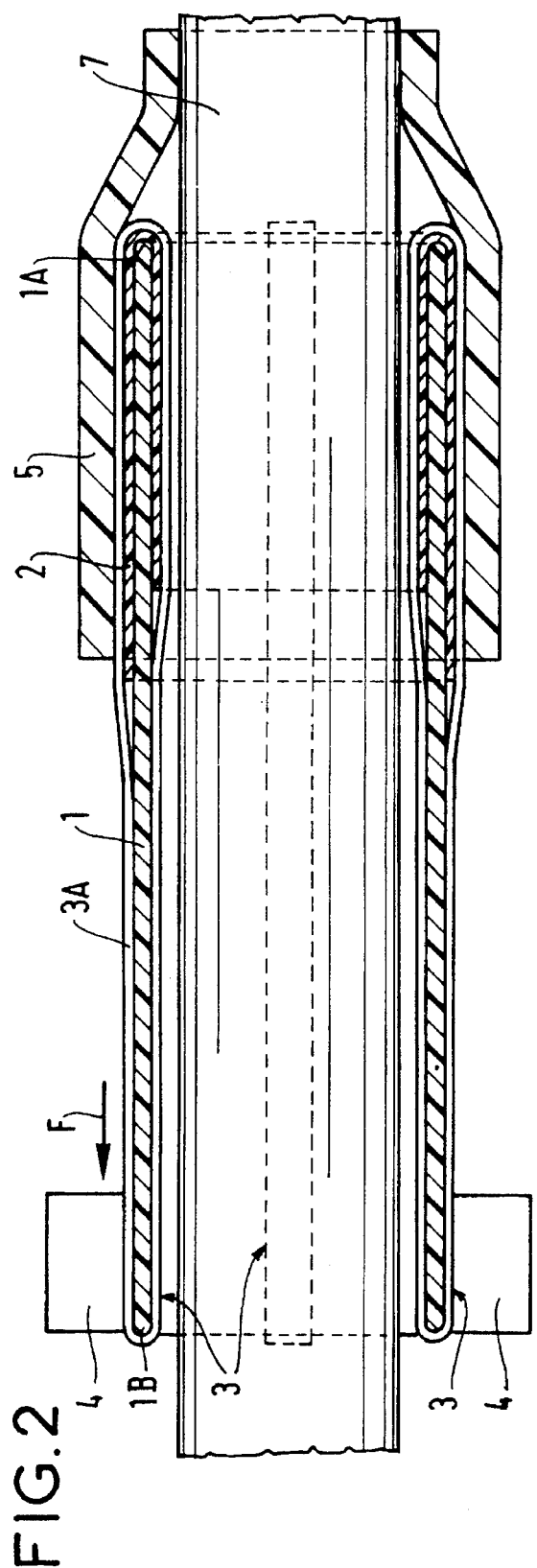

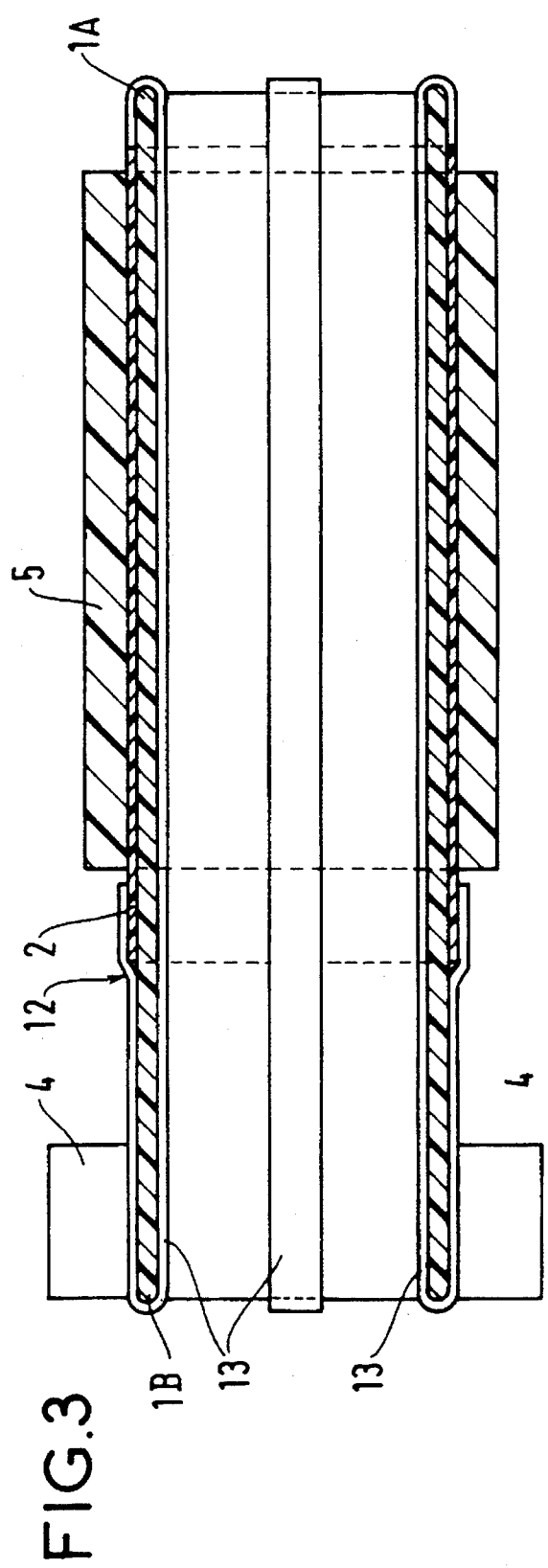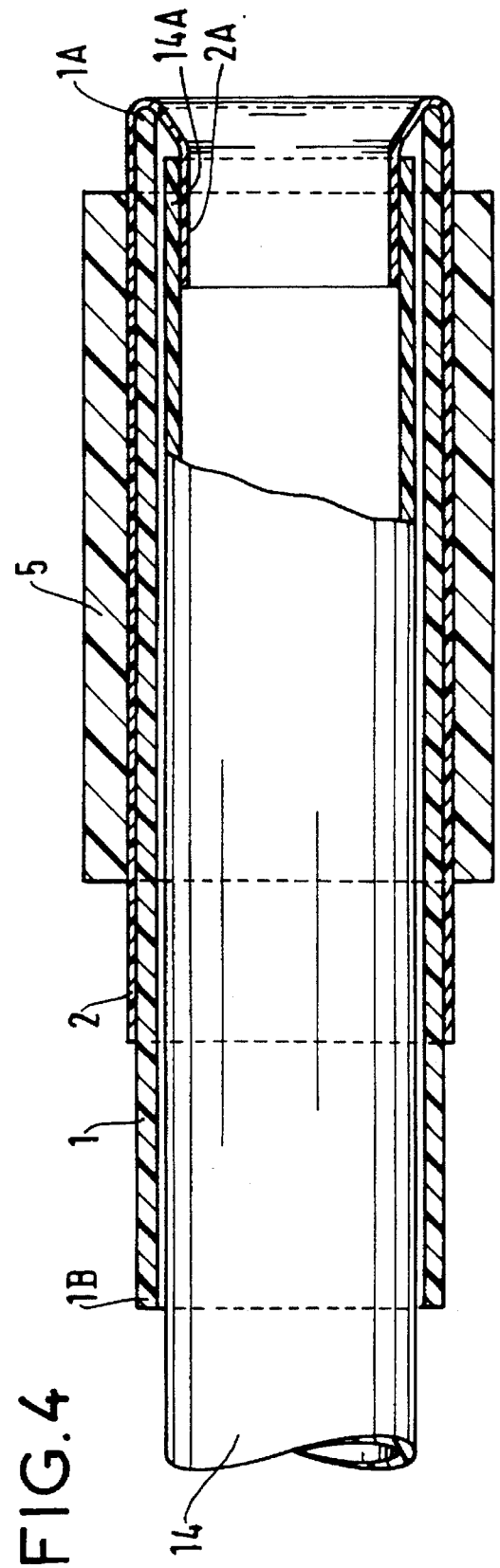

TUBULAR SUPPORT FOR INSTALLING A CONTRACTABLE ELASTIC SLEEVE

The present invention relates to a tubular support for installing a contractable elastic sleeve, enabling the sleeve to be put into place on a cylindrical element that the sleeve is to cover tightly.

BACKGROUND OF THE INVENTION

That type of support as such is already known. It receives the pre-expanded sleeve and it is threaded over the cylindrical element that is to receive the sleeve, which element has an outside diameter that is smaller than the inside diameter of the support. The support is removed from inside the sleeve by sliding over the cylindrical element so as to leave the sleeve on the cylindrical element while simultaneously allowing the sleeve to contract.

Particular cylindrical elements include terminal equipment and junctions for power cables. Naturally, the cylindrical element could be any other element which is to receive a protective elastic sleeve that contracts tightly onto the element.

Document FR-A-2 592 825 describes such a support. That support is constituted by a rigid tube of plastics material, with its outside surface covered over at least a fraction of the length of the tube with a film having a low coefficient of friction. The film may be a polyester film with a silicone coating, for example. It extends over the tube substantially from one of its ends, referred to as the "front" end of the tube. At said front end it is fixed against the inside surface of the tube, and on the tube it is free.

The elastic sleeve which is initially expanded onto the film-covered tube is subsequently put into place on the cylindrical element by backward sliding from the tube onto the element, with the sleeve being held in place relative to its position on the element. The sliding is performed by pulling on the "rear" other end of the tube, which other end, for this purpose, is advantageously not covered by the film. The tube is thus extracted progressively from within the sleeve which moves bit by bit directly into place onto the element while simultaneously contracting. During withdrawal of the tube, the film turns inside-out at the leading end of the tube between the cylindrical element and the sleeve that is in place and has contracted onto the element. The film is withdrawn by a corresponding additional rearwards stroke of the tube on the element.

In practice, such a support is usable for installing elastic sleeves that are relatively short and not very thick, since otherwise there is a risk of the film jamming or being torn between the cylindrical element and the already-installed contracted sleeve while the film is being withdrawn. It is difficult or even impossible to use when the sleeve is long and/or thick.

OBJECTS AND SUMMARY OF THE INVENTION

An object of the present invention is to remedy that problem, thereby enabling elastic sleeves of greater or lesser length and of greater or lesser thickness to be installed without difficulty.

The present invention provides a tubular support for installing a contractable elastic sleeve, the support receiving the expanded sleeve for the purpose of installing it on a rigid cylindrical element threaded through said support, the support comprising a rigid tube and a film having a low coefficient of friction covering the outside surface of the rigid tube over at least a fraction of the length of the rigid tube and running substantially from a "front" end thereof, which end corresponds to a front margin of said film, wherein said film is mounted so as to be completely free relative to said rigid tube, and wherein the tubular support also includes guide and drive means for said film for guiding and driving said film from the outside surface of said rigid tube, around the front end, and along the inside surface of said rigid tube.

The support preferably presents at least one of the following additional characteristics:

the ends of the rigid are rounded;

the said guide and drive means are constituted by a set of belts, that preferably have a low coefficient of friction, that are mounted on the film and that form closed loops via the inside of the tube, or that are secured to the film and looped back to the film via the inside of the tube, or else said means are constituted by an auxiliary tube sliding inside said rigid tube and significantly longer than said rigid tube, being mounted to project from the "rear" other end of said rigid tube and having the leading edge of said film secured to the inside thereof;

said rigid tube is provided with rear means for being grasped and actuated in the hand; and the outside surface state of the rigid tube is granular, thereby imparting a low coefficient of friction thereto relative to said film.

BRIEF DESCRIPTION OF THE DRAWINGS

The characteristics and advantages of the present invention appear from the following description of preferred embodiments illustrated in the accompanying drawings. In the drawings:

FIG. 1 is a section view through a tubular support of the invention, shown carrying a contractable elastic sleeve that is to be installed;

FIG. 2 is a view analogous to FIG. 1, showing the sleeve carried by the support being put into place on a cylindrical element;

FIG. 3 is a section view through a first variant embodiment of the FIG. 1 support;

FIG. 4 is a section view of a second variant embodiment of the FIG. 1 support.

MORE DETAILED DESCRIPTION

Figure 5:
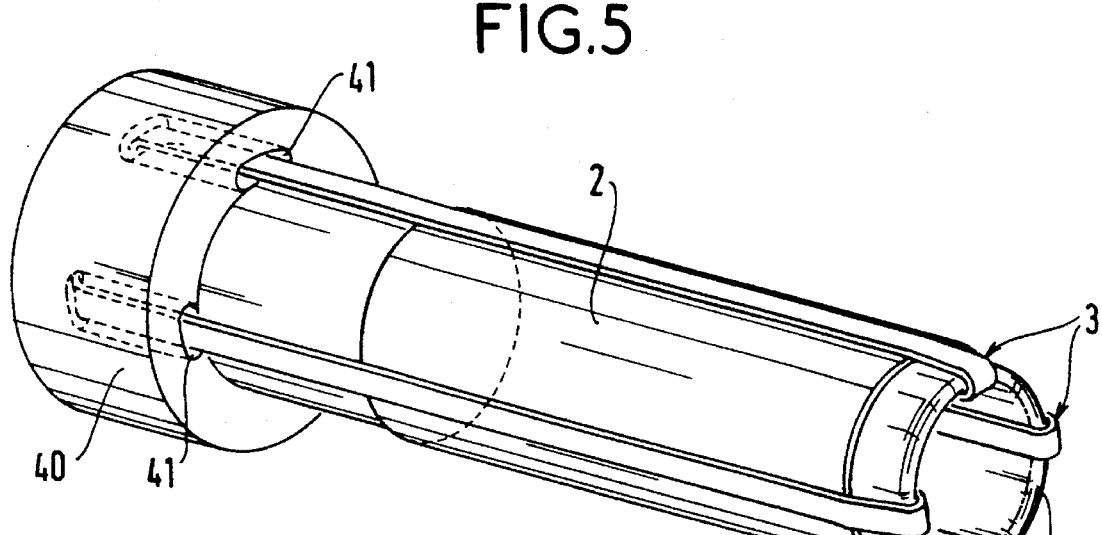
FIGS. 5, 6, and 7 are perspective views of variants relative to FIG. 1, and they relate essentially to dispositions provided on the support to enable it to be actuated.

The tubular support shown in FIG. 1 comprises a rigid tube 1 whose outside surface is covered by a strong flexible film 2 having a low coefficient of friction and extending over at least a fraction of the length of the tube from substantially a "front" end 1A thereof. The film is made of polyester or the like and on both faces it carries an anti-adhesive coating, e.g. based on silicone, giving it a very low coefficient of friction.

The film 2 is not fixed to the tube 1 but is completely free relative to the tube. It is associated with drive means constituted by a set of belts 3 extending around the front end 1A of the tube and extending longitudinally inside the tube.

Each of the belts 3 is in the form of a closed loop, and all of the belts extend freely over the film and against the inside surface of the tube between the front and rear ends 1A and 1B of the tube. They hold the film on the tube, and when they are driven, they serve to guide and drive the film around the front end 1A of the tube (or optionally around its rear end), and along the inside surface of the tube. The belts are strong and they preferably have a low coefficient of friction. They may be made of material of the same nature as the film 2 and like the film they may be given an anti-adhesive coating, in particular a coating based on silicone.

Both ends of the tube 1 are rounded so as to present a radius of curvature that prevents the film or the belts tearing or being damaged as they go around an end.

The rear end portion of the tube 1 also has a shoulder that is segmented into sectors 4 that project a considerable distance from its periphery, and between which the belts 3 can pass freely, thereby constituting hand-grip means for the tube to enable it to be actuated without touching the belts and without interfering with their movement.

Advantageously, in order to further reduce the friction forces of the film and the belts against the tube, the outside surface of the tube is granular.

Such a granular state for the outside surface of the tube 1 is obtained by treating the corresponding surfaces of parts for molding the tube, or by coating the initially smooth outside surface of the tube with an auxiliary film that is granular, and that is applied to the tube and is stuck thereon.

In FIG. 1, there can also be seen a contractable elastic sleeve 5 carried by the tube for the purpose of being subsequently installed on a rigid cylindrical element of outside diameter that is smaller than the inside diameter of the tube. The sleeve 5 is expanded so as to enable it to be mounted on the portion of the tube 1 that is covered by the film 2.

FIG. 2 shows the elastic sleeve 5 being laid on such a rigid cylindrical element 7 which is shown as being in the form of a relatively long cylindrical body that may be constituted, in particular, by an electric cable, by a terminal equipment for a cable, or by a junction between two spliced-together cables.

The tube carrying the expanded sleeve is positioned on the cylindrical element so that the sleeve overlies its future location on the element, onto which it will contract directly as it is being laid. This installation of the sleeve 5 on the cylindrical element 7 is performed by pulling the rear end 1B of the tube 1, by making use of the shoulder sectors 4. The rearwards sliding of the tube over the element for the resulting disengagement thereof from the inside of the sleeve is represented by arrow F. It is achieved while the sleeve is held in position, e.g. by hand, over its final location on the element.

This rearward sliding of the tube 1 causes the outside strands 3A of the belts 3 to be driven in the direction opposite to the arrow F over the tube 1 and for these belts thus to drive the film 2 around the front end 1A of the tube and along the inside surface of the tube towards its rear end 1B. The film 2 is thus directly disengaged from the elastic sleeve which contracts progressively as the tube moves rearwards over the cylindrical element. This ensures that there is no possibility of the film 2 jamming between the cylindrical element and the contracted sleeve while it is being itself removed from inside the contracted sleeve as is required in the above-mentioned prior art.

FIG. 3 shows a variant of the FIG. 1 embodiment in which the belts referenced 13 are secured to the film 2 which covers the portion of the tube 1 carrying the elastic sleeve 5. These belts 13 are cut out from the initial film referenced 12 that is provided with a length that is slightly greater than twice the length of the tube. They extend from the front edge of the film 2 situated substantially at the front end 1A of the tube going all the way to the rear end 1B of the tube via the inside of the tube and they are then fixed, e.g. by gluing, to the opposite rear margin of the film 2.

In a variant, the belts 13 are initially independent of the film 2 and they are secured thereto by being glued to the front and rear margins of the film 2 when on the tube 1.

The rearward sliding of the tube 1 for disengagement of the tube from inside the sleeve 5 is accompanied by the film 2 moving around the front end of the tube and by the film 2 advancing against the inside surface of the tube.

FIG. 4 shows another variant of the FIG. 1 embodiment in which the drive means for the film 2 is constituted by an inside auxiliary tube 14. The auxiliary tube has an outside diameter that is slightly smaller than the inside diameter of the tube 1 so as to enable it to slide therein, while its own inside diameter is still slightly greater than the outside diameter of the cylindrical element that is to receive the elastic sleeve 5. In this embodiment, the front margin 2A of the film 2 is secured to the front end 14A of the inside auxiliary tube 14, and preferably to the inside surface thereof, e.g. by gluing.

The rearward sliding of the tube 1 is accompanied by rearward sliding of the inside auxiliary tube 14 that is performed by the operator. The rearward sliding of the tube 1 may be obtained without any need for shoulder sectors on the rear end thereof. The auxiliary tube is slightly longer than the tube 1 and it is mounted so as to project a little from the rear end 1B of the tube 1.

Figure 6:
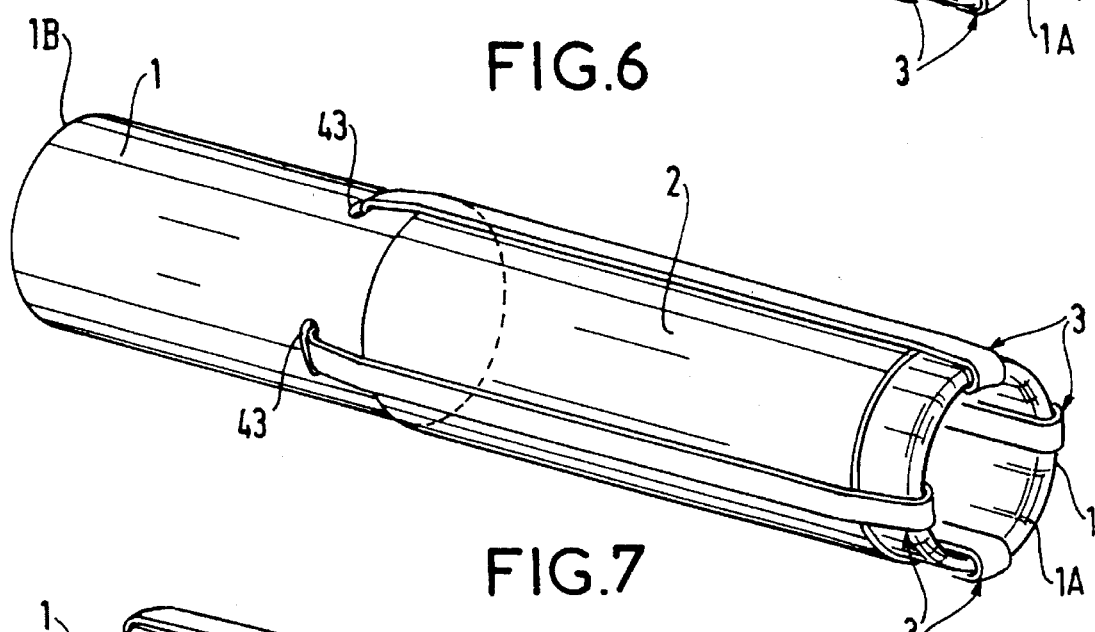
Figure 7:
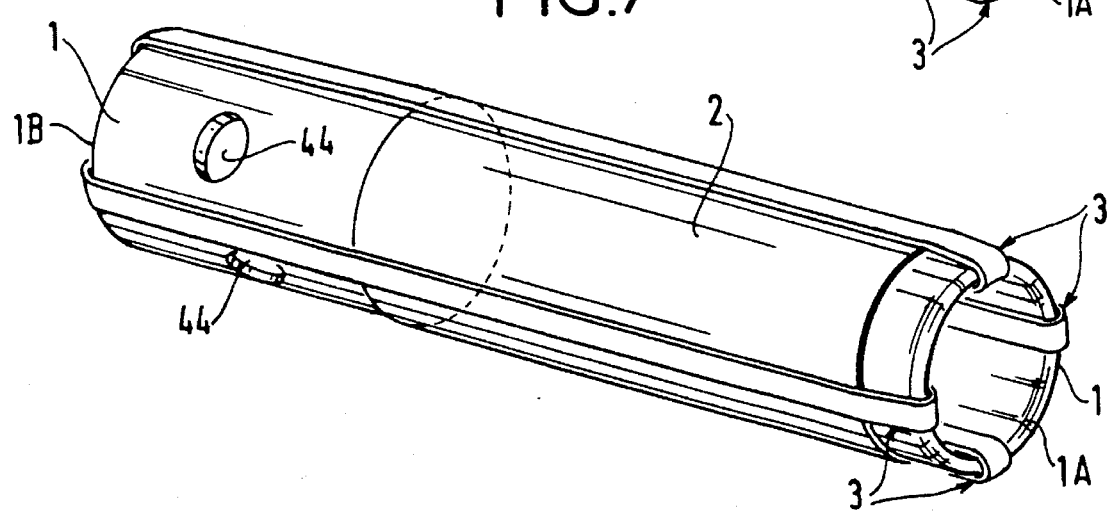

FIGS. 5 to 7 show variants of the FIG. 1 embodiment showing various means for grasping the tube 1 to cause it to slide rearwards, together with any consequential modifications that may be necessary in the belts 3.

In FIG. 5, the tube 1 has a peripheral shoulder 40 on its rear end portion. This shoulder is pierced at its base by channels 41 so as to allow each belt 3 to pass therethrough.

In FIG. 6, the tube 1 is pierced by holes 43 that are spaced apart from one another around its periphery beyond the end of the film 2 and situated close to the rear end 1B of the tube. Each of these holes 43 serves to pass one of the belts 3 between the inside and outside surfaces of the tube 1 so as to leave the rear terminal portion of the tube 1 completely free for grasping in the hand. Naturally, the rear terminal portion could be provided with a peripheral shoulder to facilitate pulling it rearwards.

In FIG. 7, the tube 1 is pierced by openings 44 that are spaced apart from one another around its periphery and that are situated close to its rear end 1B, said openings lying between the belts 3 and the belts running from one of the tube to the other. These openings 44 are provided to receive the fingers of an operator so as to give the operator a better hold of the tube, or else they serve to receive a tool for pulling the tube rearwards.

Naturally, the belts 3 covering the film 2 in the embodiments of FIGS. 5 to 7 may be secured to the film as shown in FIG. 3. It is also clear that the belts which are shown as being four in number in FIGS. 1 to 3 and 5 to 7 could be provided in some other number.

Naturally, the rigid tube 1 and the optional auxiliary tube 14 could have a line of weakness or some other equivalent means to enable final removal thereof from the periphery of one or both spliced-together cables whose junction is protected by the sleeve once it is in place.

We claim:

1. A tubular support for installing a contractable elastic sleeve, the support receiving the expanded sleeve for the purpose of installing it on a rigid cylindrical element threaded through said support, the support comprising a rigid tube and a film having a low coefficient of friction covering the outside surface of the rigid tube over at least a fraction of the length of the rigid tube and running substantially from a front end thereof, which end corresponds to a front margin of said film, wherein said film is mounted so as to be completely free relative to said rigid tube, and wherein the tubular support also includes guide and drive means for said film for guiding and driving said film from the outside surface of said rigid tube, around the front end, and along the inside surface of said rigid tube.

2. A support according to claim 1, wherein at least said front end of said rigid tube is rounded.

3. A support according to claim 1, wherein said guide and drive means is constituted by a set of belts preferably having a low coefficient of friction, the belts being mounted on the film and the rigid tube, and forming closed loops passing via the inside of the tube and against the inside surface thereof.

4. A support according to claim 1, wherein said guide and drive means is constituted by a set of belts preferably having a low coefficient of friction, secured to the front margin and to the rear opposite margin of said film and connecting said margins together via the inside of the rigid tube.

5. A support according to claim 4, wherein said belts are cut out from an initial film, extending from the front margin of said film and being secured to the rear margin 6. A support according to claim 1, wherein said guide means comprises a set of belts, and said rigid tube has a set of holes which accommodate the set of belts and are situated close to the rear other end of the tube, each hole serves to pass a respective one of said belts therethrough.

7. A support according to claim 1, wherein drive and guide means is constituted by an auxiliary tube slidably mounted in said rigid tube and significantly longer than said rigid tube, projecting from the "rear" other end of said rigid tube, and secured to the front margin of said film.

8. A support according to claim 3, wherein said rigid tube includes rear means for enabling it to be grasped and actuated in the hand, and that are provided on the end portions of the rigid tube that are not covered by said film, which end portions define a rear other end of said rigid tube.

9. A support according to claim 8, wherein said rear means comprise a set of openings.

10. A support according to claim 8, wherein said rear means comprise a peripheral shoulder.

11. A support according to claim 8, further comprising a shoulder which is segmented into sectors allowing said belts to pass freely between them.

12. A support according to claim 8, further comprising a shoulder which is pierced by channels for passing said belts.

13. A support according to claim 1, wherein said rigid tube has an outside surface state that is granular, thereby imparting a lower coefficient of friction thereto relative to said film.

* * * * *